United States Patent [19]

Wiedenmann

[11] 3,859,461

[45] Jan. 7, 1975

[54] OPERATIONAL METHOD FOR THE CONTROL OF A DEVICE

[75] Inventor: Wolfgang Wiedenmann, Munich, Germany

[73] Assignee: Siemens Aktiengesellschaft, Berlin and Munich, Germany

[22] Filed: May 21, 1973

[21] Appl. No.: 362,201

[30] Foreign Application Priority Data

Aug. 28, 1972 Germany .......................... 2242280

[52] U.S. Cl. .............................. 178/30, 340/324 A

[51] Int. Cl. .............................................. G06f 3/00

[58] Field of Search ............340/172.5, 146.3 AQ, 340/146.3 WD, 146.3 FT, 324 A, 147 P; 178/30; 179/18 ES

[56] References Cited

UNITED STATES PATENTS

| | | | |
|---|---|---|---|
| 3,167,746 | 1/1965 | Reines et al. | 340/146.3 AQ |
| 3,713,109 | 1/1973 | Hornung | 340/172.5 |
| 3,725,900 | 4/1973 | Ohmann et al. | 340/324 A |

*Primary Examiner*—Thomas A. Robinson

*Attorney, Agent, or Firm*—Hill, Gross, Simpson, Van Santen, Steadman, Chiara & Simpson

[57] ABSTRACT

An operational method and apparatus for the control of a device in dependency upon an instruction word and a feature assigned to the instruction word, whereby the instruction word is supplied to a storer which subsequently releases, for each instruction word, a substitution address and at least one control word which serves for the control of the device, in which all instruction words, to which are assigned the same feature, are combined into a single group, with each group being assigned a respective block in a storer, a syllable of a substitution address being stored in a register and utilized for the control of the device in conjunction until all control words assigned to an instruction word have been supplied to the controlled device.

7 Claims, 7 Drawing Figures

OPERATIONAL METHOD FOR THE CONTROL OF A DEVICE

BACKGROUND OF THE INVENTION

The invention is directed to an operational method for the control of a device in dependency on an instruction word and a feature which is assigned to the instruction word. The instruction word is fed into a storer which subsequently releases, timewise, per instruction word, a substitution address and at least one control word serving for the control of the device.

If a device is to be controlled by instruction words, and the control is dependent on features which are assigned to several instruction words, the information with respect to the feature assigned to the instruction word, must, in some way, be stored. While it would be conceivable to use a fixed value storer to which is initially fed the instruction words, and which supplies data over its output lines characterizing the different features, such a fixed value storer would require a relatively high technical expenditure since a storage cell of the storer would be required for each word.

The invention is directed to the problem of providing an operational method of the initially mentioned type for which implementation relatively little technical resources are required.

BRIEF SUMMARY OF THE INVENTION

According to the invention, in a method of the initially mentioned type, all instruction words, to which are assigned the same feature, are combined into a single group, and each group is assigned a block of the storer. In addition, the information of one syllable of the substitution address is stored in a register until all control words assigned to the instruction word are directed into the device, with the latter being controlled by means of the information stored in the register.

The method according to the invention is characterized in that for its implementation only relatively little technical resources are required since there is a considerably lower number of different types of syllables of substitution addresses than there are different types of instruction words. Consequently, for storing the information of the syllables, a substantially smaller storage capacity is required than would be necessary for the storage of all instruction words and their assigned features.

If the features which are assigned to the instruction words are to be characterized by various pulse sequence frequencies of timed counting impulses, and if the device is to be controlled thereby, it is advantageous to control the dividing ratio of a timing generator with the information stored in the register and to use its pulses for the control of the device.

In a preferred embodiment of the invention, an ink jet recorder is provided as the controlled device, to which is to be supplied instruction words for the designation of characters to be produced by the recorder.

Each instruction word and each character which is to be written, thus can be assigned a specific optimum writing speed at which, according to experience, the character is written. Consequently, it is advantageous to combine all instruction words and characters, to which the same recording speed is to be assigned, into a group and to assign a respective block of the storer to such group.

BRIEF DESCRIPTION OF THE DRAWINGS

In the drawings wherein like reference characters indicate like or corresponding parts.

DETAILED DESCRIPTION OF A PREFERRED EMBODIMENT OF THE INVENTION

Figure 1:
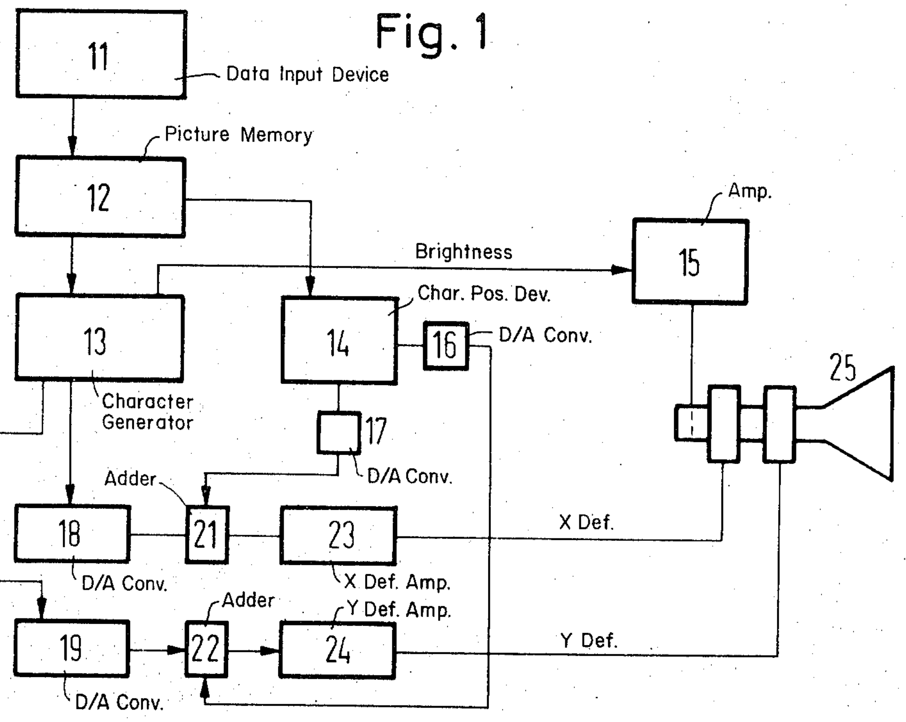
FIG. 1 is a block diagram of a circuit arrangement for the graphic presentation of characters in accordance with the present invention.

Referring to FIG. 1, the circuit arrangement therein illustrated represents a visual data indicator comprising a data input device 11, a picture repetition memory 12, a character generator 13, a character position device 14, amplifier 15, digital-analog converters 16, 17, 18 and 19, adding stages 21 and 22, respective deflection signal amplifiers 23 and 24, and a picture tube 25. The data input device 11 may, for example, be in the form of a manual keyboard or a computer and the circuit schematically illustrated in FIG. 1 thus is operative to depict on the picture screen of the tube 25 the desired characters as determined by the data input device 11. The necessary signals which are required to control the cathode ray of the picture tube 25 for producing the desired character, are produced in the character or symbol generator 13. Such signals include a brightness signal which is supplied to the amplifier 15 and ultimately to the control grid of the cathode ray tube to effect a control in the intensity of the cathode beam thereof. Also produced in the character generator 13 are respective coordinate deflection signals which are conducted to respective digital-analog converters 18 and 19, with the analog outputs thereof being utilized to effect a deflection of the cathode ray within the area of one individual character in $x$ or $y$ coordinate directions respectively. The character position device 14 is operative to produce respective deflection signals which, after conversion to analog values in respective digital-analog converters 16 or 17, determines the position of the character reference point. The signals supplied by the respective digital-analog converters 17 and 18 or 16 and 19 respectively are added in associated adding stages 21 or 22. It will also be appreciated that the circuitry might be so designed to require only one individual digital-analog converter for each respective signal.

Figure 2:
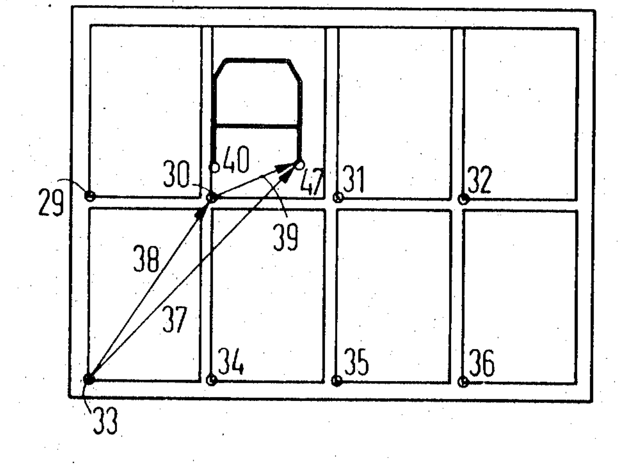
FIG. 2 illustrates a portion of a picture screen of a visual data indicating device.

FIG. 2 illustrates a portion of a picture screen of a picture tube, such as the tube 25 illustrated in FIG. 1, in which each character is to be depicted in a predetermined area. For the purpose of simplicity only 8 areas are depicted, each one of which is associated with a particular character reference point 29 through 36 respectively. Illustrated in the area identified by the reference point 30 is the character "A." The cathode ray of the picture tube 25, in accordance with the circuit of FIG. 1, is deflected, starting from a rest point, in such a way that the character A is traced in accordance with FIG. 2, and it will be assumed, for example, that the character reference point 33 also represents the position of the normal cathode ray rest point. Thus, when the character A is written, beginning with the point 40, the points 40 through 47 will be traced. The vector 37, starting from the cathode ray rest point 33 represents the deflection of a cathode ray to the point 47 and is composed of two components, the component 38 defining the position of the character reference point 30, and the component 39 defining the position of the point 47 with respect to the reference point 30. The component 38 is suitably derived in conjunction with the operation of the character positioning device 14 of FIG. 1 and such component is not considered in detail as its construction does not form a part of the subject matter of this invention. However, the production of signals which are required for deflecting the cathode ray to produce the component 39 is hereinafter considered in greater detail with the assistance of FIGS. 3 through 7.

Figure 3:
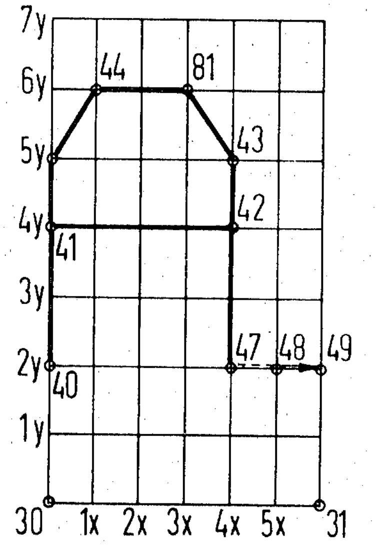
FIG. 3 illustrates a portion of the structure of FIG. 2, but in greater detail, in connection with the depiction of the character or symbol A.

FIG. 3 illustrates the character "A," illustrated in FIG. 2, but in greater detail. Beginning with the character reference point 30, the points 1*x*, 2*x*, 3*x*, 4*x*, and 5*x* represent points along the abscissa between the reference point 30 and the next reference point 31. In like manner the points 1*y*, 2*y*, 3*y*, 4*y*, 5*y*, 6*y*, and 7*y* are disposed in ordinate direction. When the character "A" is written, the component 39 and thus the vector 37, illustrated in FIG. 2, initially extends in direction toward the point 40. Starting from this point, the electron beam records the illustrated line trace to point 41 and then successively to the points 42, 43, 81, 44 and back to 41. However, when following from point 41 to point 42 a second time, the electron beam is cut off so that the screen is not illuminated by such beam travel. However, the beam travel from point 42 to point 47 will again be operable to form an illuminating line between these two points. The character "A" thus is depicted. The electron beam is then deflected from the point 47 through point 48 through point 49, during which travel the beam is again cut off so that no illumination takes place during such travel. The next character can then be written in the area having the character reference point 31.

Figure 4:
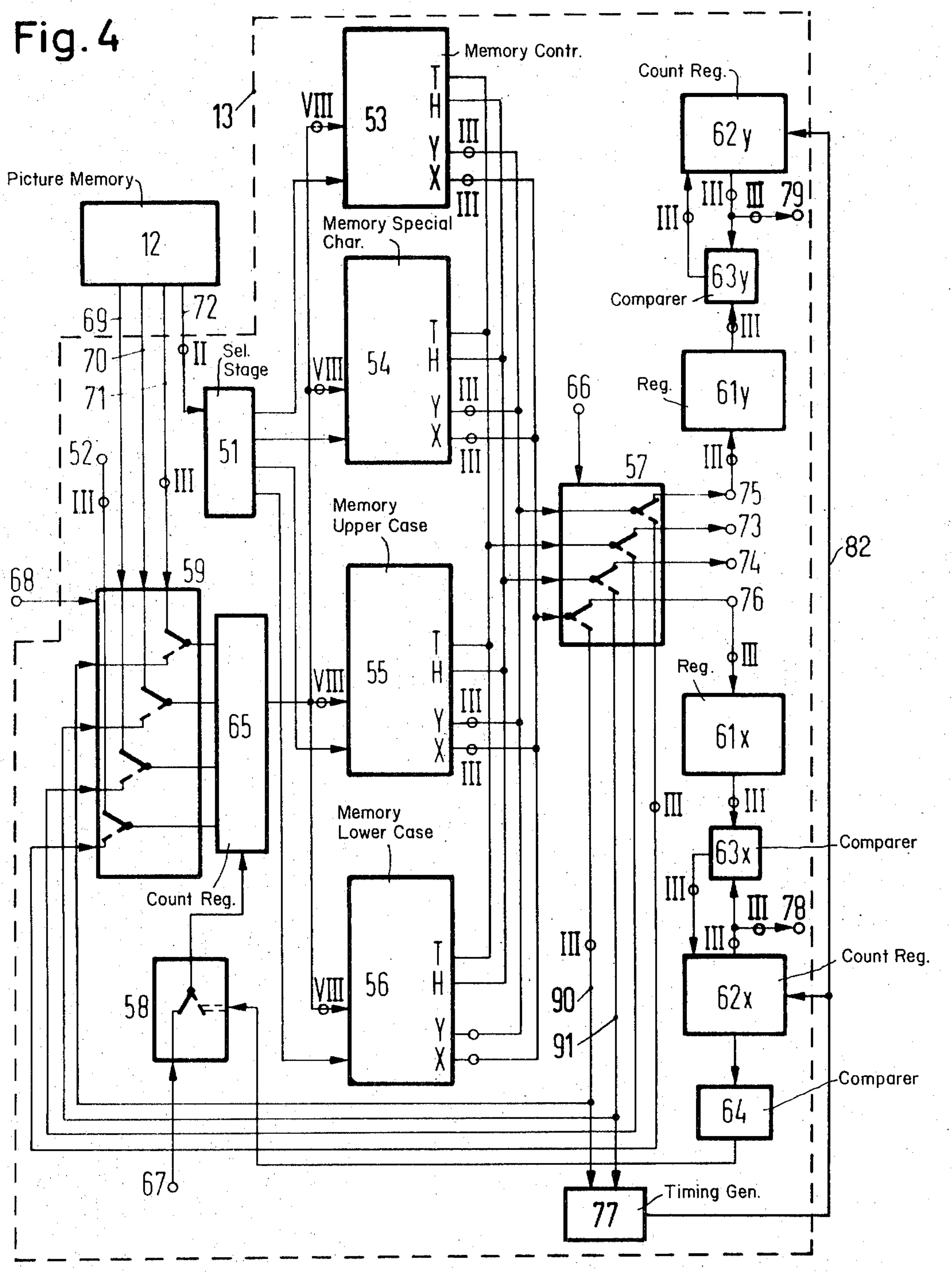
FIG. 4 is a circuit diagram, also in block form, illustrating in detail the character or symbol generator, merely illustrated as a single block in FIG. 1.

FIG. 4 illustrates, in block form, the schematic diagram of the character or symbol generator 13, illustrated in FIG. 1. Such generator comprises a selection stage 51, respective memories 53, 54, 55 and 56, switching stages 57, 58, 59 registers 61*x*, 61*y*, counting registers 62*x*, 62*y*, respective comparing circuits 63*x*, 63*y*, and an additional comparing circuit 64 and an additional counting register 65, together with cooperable connection lines. In order to present a more simple circuit representation, parallel connection lines are represented by merely a single line identified with a circle and adjacent roman numerals associated therewith identify the number of individual lines represented by each such single line.

The signals transmitted over most of the illustrated lines represent binary values, identified as a 0 value or 1 value, and the corresponding signals are therefore designated as 0 signals or 1 signals respectively. The memories 53 through 56 preferably are MOS fixed value memories respectively storing 256 words, each with eight bits.

Each of such memories is also provided with a respective addressing stage (not individually illustrated) by means of which desired words therein may be selected in dependence upon initially supplied data. In the example illustrated, the memory 53 is provided for control signals, etc., the memory 54 for special characters and numerals, the memory 55 for upper case or capital letters, and the memory 56 for lower case or small letters. The first 32 words of each memory is associated with respective characters, and also store addresses where further data is stored for the illustration of a respective character.

The following represents a table listing the respective addresses 41*a*, 42*a*, 43*a*, 44*a*, 45*a*, 46*a*, 47*a*, and 48*a* with the associated stored binary values pertaining thereto, and in which the columns 4*x*, 2*x*, 1*x*, 4*y*, 2*y*, and 1*y* designate the coordinates illustrated in FIG. 3.

| | 4*x* | 2*x* | 1*x* | 4*y* | 2*y* | 1*y* | *H* | *T* |
|---|---|---|---|---|---|---|---|---|
| 41*a* | 0 | 0 | 0 | 1 | 0 | 0 | 1 | 1 |
| 42*a* | 1 | 0 | 0 | 1 | 0 | 0 | 1 | 1 |
| 43*a* | 1 | 0 | 0 | 1 | 0 | 1 | 1 | 1 |
| 44*a* | 0 | 0 | 1 | 1 | 1 | 0 | 1 | 1 |
| 45*a* | 0 | 0 | 0 | 1 | 0 | 0 | 1 | 1 |
| 46*a* | 1 | 0 | 0 | 1 | 0 | 0 | 0 | 1 |
| 47*a* | 1 | 0 | 0 | 0 | 1 | 0 | 1 | 1 |
| 48*a* | 1 | 0 | 1 | 0 | 1 | 0 | 0 | 0 |

The column designated by the letter H refers to the brightness control of the cathode ray, i.e., operative to effect illumination or non-illumination of the tube screen, while the column T relates to control signals whose function is not pertinent to the present invention. It will be noted that the 0 values and 1 values stored under the address 41*a* designate the coordinates of the point 41 in digital form. The respective outputs of memories 53 through 56 (FIG. 4) are thus denoted by the letters, T, H, *y* and *x*, for the control signal T, the brightness signal H, and the coordinates *y* and *x* respectively, all of which are supplied thereat in binary form.

The respective switching stages 57, 58 and 59 receive control signals for effecting the actuation of the associated switches illustrated, as well as timing pulses over the circuits terminals 66, 67 and 68. The registers 61*x*, 61*y* and the counting registers 62*x*, 62*y* are respectively designed for three bit operation and thus contain three stages and store three-digit binary numbers. The comparing devices 63*x* and 63*y* compare the respective binary numbers supplied thereto and supply signals at their outputs containing the information that one of the two binary numbers is either smaller, larger or equal to the other binary number.

The counting registers 62*x* and 62*y* receive timed counting impulses over the line 82. The greater the repitition frequency of these counting pulses, the more rapid will operate the counting registers 62*x* and 62*y*, and the faster the comparisons will be effected.

The timed counting pulses are generated in the timing generator 77, in dependency on the signals appearing on lines 90 and 91.

The addresses of the characters which are to be illustrated are identified in the seven-bit-ASCII-code, one bit of such character address being supplied by the picture repitition memory 12 over each of seven lines 69, 70, 71 and 72. Information with respect to the specific type of character is supplied over the two lines 72 with the respective two bits thereof thus designating whether there is involved control characters, special characters and numbers, capital letters or small letters respectively and depending upon the data supplied over the line 72 one of the memories 53 through 56 is selected in the selection stage 51 and thereby prepared for the reception of additional data to be supplied over the counting register 65.

A total of five bits of the character address is transmitted over the line 69, 70 and 71 and thus a particular character, for example, the character "A" is designated.

The manner of operation of the character generator illustrated in FIG. 4 will now be explained, assuming that the picture repetition memory 12 supplied a character address identifying the latter "A." As previously mentioned, the information transmitted over the two lines 72 to the selection stage 51 will, in this case, determine that the memory 55 is to be selected and upon a first timing pulse, the memory 55 is suitably prepared and the first five bits characterizing the letter "A" are supplied to the inputs of the memory 55 over the line 69, 70 and 71, the switches of the switching stage 59 and the counting register 65. At the same time three 0 signals are supplied with the first pulse over the circuit terminal 52, from which the addressing stage of the memory 55 recognizes that from these three 0 signals one of the first 32 addresses is involved, and by means of the additional five bits determines that the letter "A" is the selected character.

As a result of such character address representing the first word the substitution address 41*a* is supplied at the outputs of the memory 55 (refer to table). With the second pulse, the substitution address 41*a* is transmitted over the switching stage 57 and switching stage 59 to the counting register 65 (the switches of stage 57 and 59 now being in positions illustrated in dotted lines in FIG. 4). The substitution address thus is supplied over the counting register 65 to the inputs of the memory 55 and upon receipt thereof, and in the addressing stage of such memory a second word is selected, which is stored under the address 42*a* and thus is processed with information as indicated in the table. Upon the third timing pulse, the information at the outputs of the memory 55 is conducted over swtiching stage 57 (the switches now being in positions indicated in solid lines). Signals supplied at the output T of the memory are conducted to control means forming no part of the present invention. Likewise, signals at the output H of the memory are conducted to the circuit terminal 74 and from there to the amplifier 15, illustrated in FIG. 1. As illustrated, the information supplied at the *y* output of the memory is conducted over the circuit terminal 75 to the register 61*y* and the signals at the *x* output of the memory are conducted over circuit point 76 to the register 61*x* and stored therein as a digital number.

With the third and subsequent pulses, the address 41*a* is correspondingly increased at a rate of 1 whereby during subsequent pulses the addresses 42*a*, 43*a*, 44*a*, 45*a*, 46*a*, 47*a* and 48*a* are supplied over the counting register 65 to the input of the addressing stage of the memory 55. Thus, in correspondence to the supplied addresses, the words as set forth in the table are supplied in their respective order.

In connection with the explanation of the registers 61*x* and 61*y* the counting registers 62*x*, 62*y* and the comparing circuits 63*x*, 63*y*, it will be assumed that the coordinates of the point 41 are already stored in the counting registers 62*x* and 62*y* and that the coordinates of point 42 are stored in the registers 61*x* and 61*y*. The cathode ray thus has reached the point 41 (FIG. 3) so that its coordinates, entered into the registers 62*x* and 62*y*, will be termined "existing" coordinates whereas the coordinates of the point 42 to which the beam is to travel, stored in the registers 61*x* and 61*y*, will be termed the "desired" coordinates. Under these conditions, the comparing device 63*x* determines that the desired coordinate (1, 0, 0) is greater than the existing coordinates (0, 0, 0) and thereupon effects an increase in the digital number stored in the register 62*x* until the comparing device 63*x* recognizes the equality of the digital numbers stored in the two registers 61*x* and 62*x*. In this manner, the *x* coordinate is progressively increased to the value 4*x* and the signals corresponding to the digitally illustrated coordinates (0, 0, 1), (0, 1, 0) (0, 1, 1) and finally (1, 0, 0) are transmitted to the associated digital-analog converter 18 (FIG. 1) in timed sequence over the circuit terminals 78.

Simultaneously with the comparison of the *x* coordinates, a like comparison of the *y* coordinates is effected. The comparing device 63*y* determines that the *y* coordinate (1, 0, 0) of the point 41 is equal to the y coordinate (1, 0, 0) of point 42 and thus emits a signal to the counting register 62*y* which creates no change in the counting state thereof. Consequently, a 1 signal, a 0 signal and a 0 signal are conducted to the digital-analog converter 19 (FIG. 1) over the three lines at the circuit point 79. As a result of the simultaneous transmittal of signals from the circuit points 78 and 79 the cathode ray is moved from point 41 (illustrated in FIG. 3) to point 42, during which it is continuously illuminated due to the 1 value of the brightness H of the address 42*a*.

The coordinates of point 42 are now stored in the counting register 62*x* and 62*y*, and thus, now represent "existing" coordinates. With the following pulse, the coordinates of point 43 are supplied to the register 61*x* and 61*y*, with the *x* coordinates being maintained constant while the *y* coordinates are increased through the operation of the comparing devices 63*y*, whereby the coordinates of point 43 are ultimately stored in the counting register 62*x* and 62*y*.

It will now be assumed that the coordinates of point 44 are entered in the register 61*x* and 61*y* as desired coordinates. The comparing device 63*x* determines that the *x* coordinate (1, 0, 0) of point 43 is greater than the *x* coordinate (0, 0, 1) of the point 44 and thus effects a decrease of the counting state of the counting register 62*x* until the comparing circuit 63*x* indicates equality, i.e., until the *x* coordinate (0, 0, 1) of the point 44 has been reached.

The comparing circuit 63*y* determines that the desired *y* coordinate (1, 1, 0) of point 44 is greater than the *y* coordinate (1, 0, 1) of point 43 and thus effects an increase of the counting stage of the counting register 62*y* until equality has been reached, i.e., until the *y* coordinate (1, 1, 0) of the point 44 has been reached. Since the changes with respect to the *x* and *y* coordinates are made simultaneously the cathode beam initially traces the diagonal line from point 43 towards point 81 (FIG. 3) and then moves in the abscissa direction towards point 44. Consequently, storage of the coordinates of point 81 are not required since the change in direction at point 81 is carried out automatically. In a similar manner, the change in direction starting at point 44 towards point 41 is traced by the cathode ray without the necessity of storage of the coordinates of the point of change.

With the pulse ultimately supplying the data of address 48*a*, the point 48 (FIG. 3) is finally reached. At this point, the counting register 62*x* reaches the counting state 5*x*. This condition also is recognized in the comparing circuit 64 and a signal is emitted from the output of the latter to the switching stage 58, causing a switch over of the illustrated switch contacts into the dotted position. The electron ray is thus moved through the line trace corresponding to the character A, starting at point 40 and progressing to point 47. A control stage coupled with the switching stage 58 is operative to insure that the switch of the stage 58 remains in the position illustrated in solid lines from the third pulse on, so that timing impulses are supplied to the counting register 65 over the terminal 67 and the counting register 65 thus effects an increase in the addresses by 1.

Figure 5:
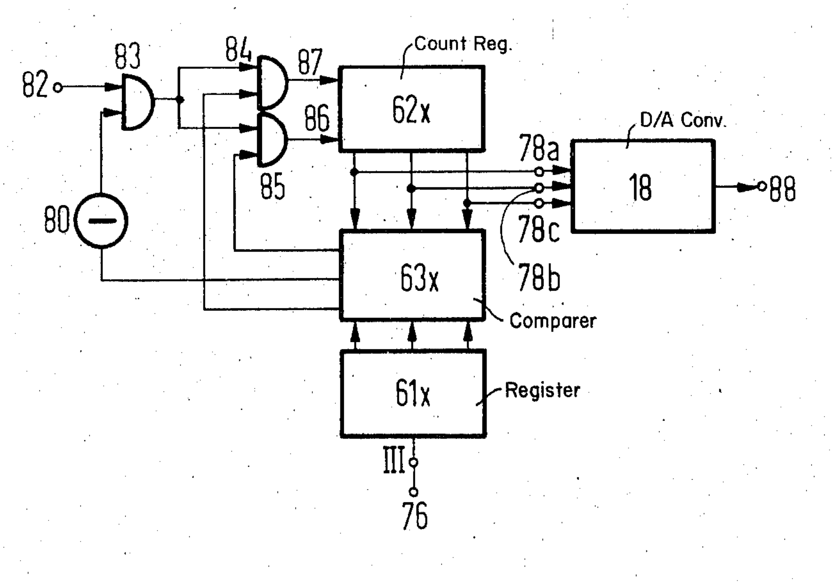
FIG. 5 is a block diagram illustrating, in greater detail, a storage register, counting register and cooperable comparing circuit generally illustrated in FIG. 4.

FIG. 5 illustrates in greater detail the circuits involving the register 61*x*, counting register 62*x* and comparing circuit 63*x* and it will be appreciated that the circuitry associated with the register 61*y*, counting register 62*y* and comparing circuit 63*y* are correspondingly constructed.

In this circuit, counting timing pulses are supplied at the point 82 and they either decrease, increase, or effect no change in the counting state of the counting register 62*x*, depending upon the output signals of the comparing circuit 63*x*, and for this purpose AND elements 83, 84 and 85 and the NOT element 80 are provided. As illustrated, the comparing circuit 63*x* has three outputs and, as long as the digital number stored in the register 61*x* is smaller than the digital number stored in the counting register 62*x*, a signal appears at the uppermost output and it therefore switches through the counting timing impulses to the line 87 over the AND elements 83 and 84, thereby causing a decrease of the counting state of the counting register 62*x*. When the digital number stored in the register 61*x* is greater than the digital number in the register 62*x*, a signal appears at the lowermost output of the comparing circuit 63*x* and it therefore switches through the counting timing pulses to the line 86 over the AND elements 83 and 85, thereby causing an increase of the counting state of the counting register 62*x*. When the digital number stored in the register 61*x* and in the counting register 62*x* are equal, a signal is supplied over the center output of the comparing circuit 63*x* which is negated as a result of the NOT element 80, whereby the operative connection of the counting timing pulses to the counting register 62*x* is prevented at the AND element 83. Consequently, the counting state of the counting register 62*x* is unchanged.

The outputs of the counting register 62*x* are connected to the digital-analog converter 18 over the lines 78*a*, 78*b* and 78*c* with the digital-analog converter 18 being connected with the adding stage 21 (FIG. 1) over the circuit point 88.

The character generator illustrated in FIG. 4, was described as supplying the signals which are required for the recording of the character A. When recording the character A, illustrated in FIG. 3, the line travels, starting from point 40, over the points 41, 42, 43, 44, 41, 42 to 47 which are written with a writing speed dependent upon the repetition frequency of the timed counting pulses which are conducted over line 82 to the comparators 62*x* and 62*y*.

Basically, it is conceivable to write all characters with the same recording speed as that of the character A. The following embodiments, however, refer to the situation where different recording speeds are desired or required. In particular the recording speed with which the individual characters are recorded should be reversed in proportion to the length of the recorded line route. Characters with a short line travel should, for example, be recorded at a relatively low speed and characters with long line travel with a relatively high speed. Such a recording operation is required if, for example, instead of the picture tube 25 illustrated in FIG. 1, an ink recorder is provided. In this case particles are deflected by means of an electromagnetic field in *x* and *y* directions, striking a paper surface. In such event, the deflection signal amplifiers 23 or 24, illustrated in FIG. 1, are connected to an *x* or *y* deflection system and the amplifier 15 is connected to the *y* deflection system. Any time parts of the character are not to be recorded, the ink jet is deflected in *y* direction to an ink-receiving sheet.

It is advisable in case of such an ink recorder to form groups of characters which are to be written with the same recording speed, and each group is represented by a respective block in the storers 53, 54, 55 and 56. It is thereby achieved that characters which are to be recorded with same speed and each of which are stored in a respective block of storers 53, 54, 55, 56 have, in part, the same substitution address. Each block is thus addressed by a certain syllable of the substitution address. In case of characters which are assigned the same recording speed, the same portions or syllables of the substitution address are released over lines 90–93. The pulse generator 77 thus is controlled by utilization of these syllables, and releases over circuit point 82 as many different sequences of timed counting pulses as there are groups of characters to be formed with the same recording speed. In the present embodiment 16 groups of characters are so formed, and by the timing generator 77, 16 different sequences of timed counting pulses may be supplied at the circuit point 82, in dependency on the syllables which are supplied over lines 90 and 91.

Figure 6:
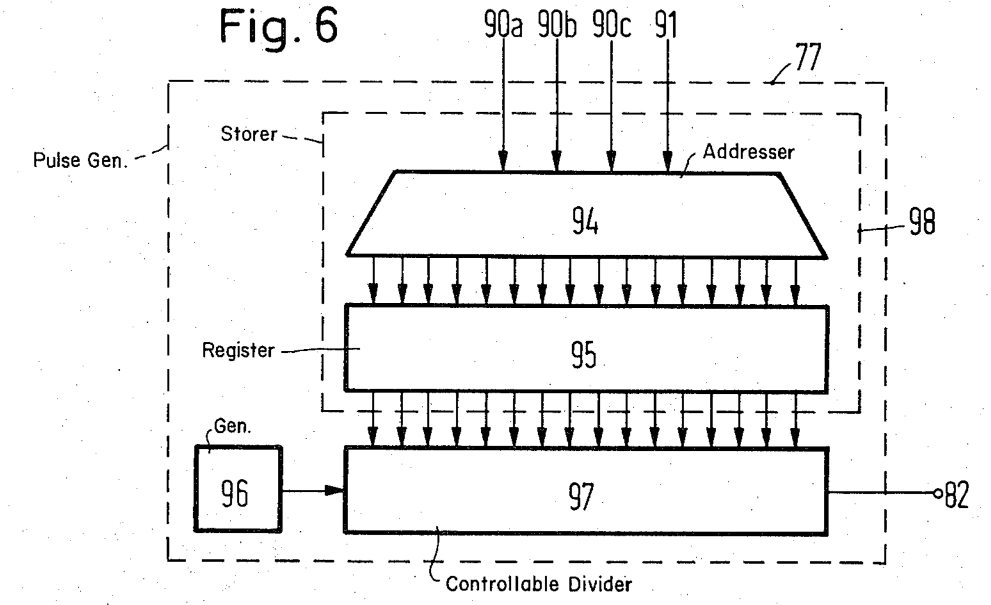
FIG. 6 illustrates, in block form, the timing generator illustrated in FIG. 4.

FIG. 6 illustrates, in greater detail, the pulse generator 77, which comprises an addresser 94, register 95, generator 96 and controllable divider 97. The three lines 90, illustrated as a group in FIG. 4, are designated in FIG. 6 as 90*a*, 90*b* and 90*c*. Thus syllables of the form 0000, 0001, 0010, 0011, 0100 up to 1111 are supplied to the addresser 94 over lines 90*a*, 90*b*, 90*c*, and 91. Altogether there are 16 such syllables to which are assigned respective output lines of the addresser 94, over which a 1 signal is released if the appropriate syllable is supplied over the inputs 90*a*, 90*b*, 90*c* and 91.

The inforamtion of the syllable of the substitution address is stored in register 95 since it has to be available during the entire period during which a character is recorded and during which, for example, the data is released with the addresses 42*a* to 48*a* of the table.

A pulse signal is created in generator 96 and is conducted to the controllable divider 97, which may comprise several, for example 16, bistable switching stages which are circuited in series, whereby the pulse signal, produced by generator 96 is conducted to the first switching stage, and the output of the last switching stage is connected to the circuit point 82. The outputs of the register 95 are so connected to the bistable switching stages that signals conducted over such outputs are operable to effect a bridging of the signal bistable switching stages of the controllable divider 97. Thus the division ratio of the divider 97 is dependent upon the information of the syllables which are supplied by the register 95 over the addresser 94. The addresser 94 and the register 95 thus function as a fixed value storer 98, to which is supplied addresses over the lines 90*a*, 90*b*, 90*c* and 91 and which releases over the outputs, words by means of which the division ratio of the controllable divider 97 is varied.

Instead of the controllable divider 97, a 16 bit binary counter can be provided which counts up to the number $2^{16}$ and then releases, over the circuit point 82 a reset pulse. If signals are not supplied over the register 95 such binary counter counts from counting result 0 up to the maximum counting result $2^{16}$. If, however, a signal is supplied by register 95 and a certain counting result is preadjusted in the binary counter, the latter will count only from this preadjusted counting result up to the maximum counting result $2^{16}$ and thus releases, in progressively shorter time intervals, resetting pulses over the circuit point 82. The total of these resetting pulses then form the sequence of the timed counting pulses.

Figure 7:
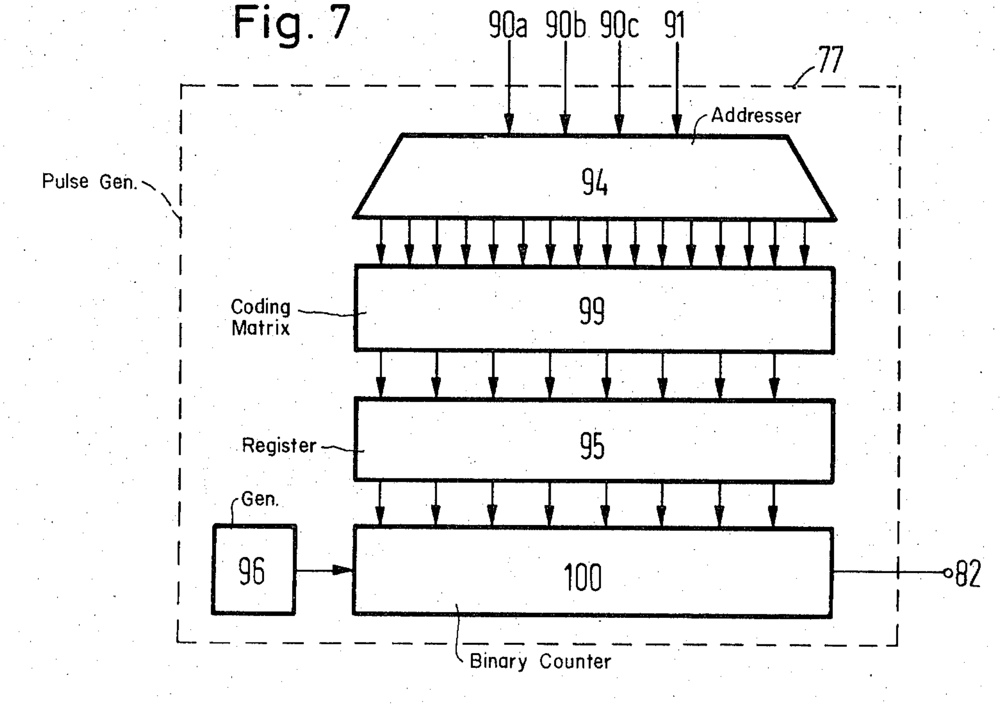
FIG. 7 is a figure, similar to FIG. 6, illustrating a further embodiment of a timing generator utilizing a binary counter.

FIG. 7 illustrates a further embodiment of the pulse generator 77, schematically illustrates in FIG. 4. In this embodiment the output signals of the addresser 94 are conducted to a coding matix 99 which effects a decoding of the syllables which are supplied over lines 90*a*, 90*b*, 90*c* and 91. In particular the words, with sixteen bits each, released from the output of the addresser 94, are assigned eight bits each, and words of eight bits each are directed from the coding matrix 99 to the register 95 where they are stored. The eight bit binary counter 100 is controlled by the output signals of the register 95 whereby the maximum counting result is $2^8$. If this maximum counting result is reached, a resetting pulse and thus a timed counting pulse is released at the circuit 82. The binary counter 100 is preadjusted to a certain counting result by the signals released from register 95, so that the resetting pulses which are released over the circuit point 82 arrive in a more rapid sequence, the higher the preadjusted counting result. The addresser 94 which is illustrated in FIG. 7, the coding matrix 99 and the register 95 may again be considered as fixed value storers.

I claim as my invention:

1. An operational method for the control of a device in dependency on an instruction word and a feature assigned to the instruction word, whereby the instruction word is supplied to a storer which subsequently releases, for each instruction word, a substitution address and at least one control word which serves for the control of the device, comprising the steps of combining all instruction words to which are assigned the same feature, into a single group, assigning to each such group a respective block in a store, storing in a register, until all control words assigned to an instruction word are conducted to the device, a syllable of such a substitution address, and utilizing such stored information in the register to control the device during the conduction thereto of such control words.

2. A method according to claim 1, comprising the further steps of controlling a pulse generator by the information stored in the register, whereby the pulse generator releases timed counting pulses, the repetition frequency of which is dependent upon the information stored in the register, and controlling the device by means of such timed counting pulses.

3. A method according to claim 1, wherein such device comprises an ink recorder which is controlled in dependency upon the instruction words for the depiction of characters.

4. A method according to claim 3, wherein said feature comprises the recording speed of the character, and is operative to control the actuation of the ink recorder.

5. A circuit arrangement for the control of a device in dependence on an instruction word and a feature assigned to the instruction word, comprising a plurality of storers, a switching stage arranged to connect, in one position thereof, the outputs of said storers to the inputs thereof, and in a second position, to connect the outputs of said storers to the device to be controlled, the instruction words having assigned thereto the same feature being disposed in a respective block of the associated storer, the latter being adapted to release a substitution address and a control word, a register in which a syllable of such a substitution address, released by the associated storer, is stored until all control words assigned to an instruction word are conducted to the device, and means for conducting the stored result of said register to the device for the control thereof during the conduction thereto of such control words.

6. A circuit arrangement according to claim 5, comprising in further combination, an addresser to which a syllable of a substitution address is conducted, said addresser having as many output lines as there are groups provided of the instruction words, the outputs of said addresser being operatively connected to the device to the controlled.

7. A circuit arrangement according to claim 6, comprising in further combination, a timing generator, a divider to the input of which the output of said timing generator is connected, the outputs of said addresser being connected to said divider, operative to control the dividing operation thereof, with the output of said divider being operatively connected to the device to be controlled.

* * * * *